(12) United States Patent
Inam

(10) Patent No.: US 12,027,844 B2
(45) Date of Patent: Jul. 2, 2024

(54) CONTROL OF PARALLEL PATHS DURING RECOVERY OF A POWER FLOW CONTROL SYSTEM FROM A TRANSMISSION LINE FAULT

(71) Applicant: Smart Wires Inc., Union City, CA (US)

(72) Inventor: Haroon Inam, San Jose, CA (US)

(73) Assignee: Smart Wires Inc., Durham, NC (US)

( * ) Notice: Subject to any disclaimer, the term of this patent is extended or adjusted under 35 U.S.C. 154(b) by 426 days.

(21) Appl. No.: 17/444,847

(22) Filed: Aug. 11, 2021

(65) Prior Publication Data

US 2022/0115862 A1 Apr. 14, 2022

Related U.S. Application Data

(60) Provisional application No. 63/198,316, filed on Oct. 9, 2020.

(51) Int. Cl.
*H02H 7/00* (2006.01)
*H02H 1/00* (2006.01)
*H02H 7/122* (2006.01)
*H02J 7/00* (2006.01)
*H02M 7/537* (2006.01)
*H02J 7/34* (2006.01)

(52) U.S. Cl.
CPC .......... *H02H 7/122* (2013.01); *H02H 1/0007* (2013.01); *H02J 7/0068* (2013.01); *H02M 7/537* (2013.01); *H02J 7/345* (2013.01)

(58) Field of Classification Search
None
See application file for complete search history.

(56) References Cited

U.S. PATENT DOCUMENTS

| | | | |
|---|---|---|---|
| 4,329,727 A | 5/1982 | Premerlani | |
| 4,473,860 A | 9/1984 | Thomas | |
| 4,517,619 A | 5/1985 | Jekubo | |
| 5,148,722 A | 9/1992 | Mehta | |
| 5,309,346 A | 5/1994 | Gyugyi | |
| 5,821,496 A | 10/1998 | Mizufune et al. | |
| 6,002,565 A * | 12/1999 | Ronisch | H02H 3/05 361/189 |
| 6,906,434 B1 | 6/2005 | Koeppe et al. | |
| 6,987,331 B2 | 1/2006 | Koeppe et al. | |
| 7,885,049 B2 | 2/2011 | Crewson et al. | |
| 8,279,571 B2 | 10/2012 | Crewson et al. | |
| 8,295,900 B2 | 10/2012 | Jang et al. | |
| 8,315,827 B2 | 11/2012 | Faybisovich et al. | |
| 8,666,255 B2 | 3/2014 | Huang et al. | |
| 9,461,458 B2 | 10/2016 | Balcerek et al. | |
| 9,798,342 B2 | 10/2017 | Gubba Ravikumar et al. | |
| 10,673,284 B2 | 6/2020 | Zeine et al. | |
| 10,680,439 B2 * | 6/2020 | Tamir | G05B 19/0425 |
| 10,727,666 B2 | 7/2020 | Ha et al. | |

(Continued)

*Primary Examiner* — Stephen W Jackson
(74) *Attorney, Agent, or Firm* — Womble Bond Dickinson (US) LLP

(57) ABSTRACT

A power flow control system and method relate to power flow control for faults on power transmission lines. An inverter has power switching devices and a capacitor. A power-safe circuit holds the power switching devices inactive during an initial fault current of the power transmission line, until a power supply for operating the inverter reaches a threshold.

20 Claims, 5 Drawing Sheets

(56) References Cited

U.S. PATENT DOCUMENTS

| | | |
|---|---|---|
| 10,734,802 B2 | 8/2020 | Ha et al. |
| 11,320,495 B2 * | 5/2022 | Dase ................... G01R 31/58 |
| 11,721,975 B2 * | 8/2023 | Saleh ................... H02H 3/52 |
| | | 361/93.1 |
| 2002/0105231 A1 | 8/2002 | Koeppe et al. |
| 2004/0027747 A1 | 2/2004 | Kim et al. |
| 2006/0268471 A1 | 11/2006 | Lee et al. |
| 2008/0253052 A1 | 10/2008 | Crewson et al. |
| 2010/0217548 A1 | 8/2010 | Faybisovich et al. |
| 2011/0045987 A1 | 2/2011 | Jang et al. |
| 2011/0075310 A1 | 3/2011 | Crewson et al. |
| 2012/0170927 A1 | 7/2012 | Huang et al. |
| 2013/0051220 A1 | 2/2013 | Ryshakov |
| 2014/0200726 A1 | 7/2014 | Balcerek et al. |
| 2014/0255020 A1 | 9/2014 | Zhang et al. |
| 2016/0246666 A1 | 8/2016 | Gubba Ravikumar et al. |
| 2017/0047727 A1 | 2/2017 | Cao et al. |
| 2018/0294644 A1 | 10/2018 | Ha et al. |
| 2018/0301894 A1 | 10/2018 | Ha et al. |
| 2019/0097464 A1 | 3/2019 | Zeine et al. |
| 2019/0250203 A1 | 8/2019 | Ali et al. |

\* cited by examiner

CONTROL OF PARALLEL PATHS DURING RECOVERY OF A POWER FLOW CONTROL SYSTEM FROM A TRANSMISSION LINE FAULT

This application claims benefit of priority from U.S. Provisional Application No. 63/198,316 titled Control of Parallel Paths During Recovery of a Power Flow Control System from a Transmission Line Fault and filed Oct. 9, 2020, which is hereby incorporated by reference.

TECHNICAL FIELD

This disclosure relates to protecting a power flow control system from a fault in a power transmission line, and in particular to protecting an inverter used to charge and discharge a direct current (DC) capacitor in the power flow control system, and technological systems and methods directed thereto.

BACKGROUND

A fault current in a power transmission line can damage sensitive electronics in a power flow control system. Example sensitive electronics include power switching devices that are configured as a four-quadrant inverter for charging and discharging a DC capacitor, used for impedance injection onto the power transmission line. In chaotic conditions accompanying the initial fault current a conventional power supply does not provide usable power. Consequently, an embedded controller will not be effective in limiting damage to the power flow control system. Accordingly, there is a need in the art for special circuits that will protect the power flow control system from damage during the initial fault current surge.

SUMMARY

Various embodiments of a power flow control system and related method of operation of a power flow control system are described herein.

One embodiment of a power flow control system has an inverter and a power-safe circuit. The inverter has power switching device and a capacitor. The inverter is arranged for connection into a power transmission line and charging and discharging the capacitor. A power-safe circuit is connected to the inverter. The power-safe circuit holds the power switching devices in active, during an initial fault current of the power transmission line, until a power supply for operating the inverter reaches a threshold.

One embodiment of a power flow control system has an inverter, a bypass unit, a power supply, a power-safe circuit and a controller. The inverter has power switching devices and a capacitor. The bypass unit is connected to the inverter, and arranged to bypass the inverter. The bypass unit is arranged for connection to a power transmission line. The power-safe circuit is connected to the inverter. The power-safe circuit is to hold inactive the power switching devices during a fault on the power transmission line, until the power supply reaches a threshold. The controller is connected to the power supply. The controller is connected to the inverter through the power safe circuit. The controller is to control the inverter to charge and discharge the capacitor to compensate for the fault on the power transmission line.

One embodiment is a method of operation of a power flow control system. An inverter is coupled to a power transmission line through a bypass unit. The method includes holding power switching devices of an inverter inactive during a fault on the power transmission line, until a power supply that is harvesting power from the power transmission line reaches a threshold. The method includes bypassing the inverter, through the bypass unit. The method includes operating the inverter to charge and discharge a capacitor of the inverter, to compensate for the fault on the power transmission line, with the inverter not bypassed.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

During recovery from a fault on a power transmission line, control of three parallel paths is considered to avoid damage to power switching devices in a power flow control system. The three parallel paths include (1) a vacuum switched link (VSL), (2) an inverter used to charge and discharge a DC capacitor, with antiparallel diodes associated with the power switching devices, and (3) a bank of silicon-controlled rectifiers (SCRs). During an initial rise of the fault current, a fail-safe circuit is used to protect the power switching devices by holding them in an OFF state. On reaching a certain power supply threshold the bank of SCRs is turned ON, providing a second parallel path for bypassing the fault current.

Figure 1:
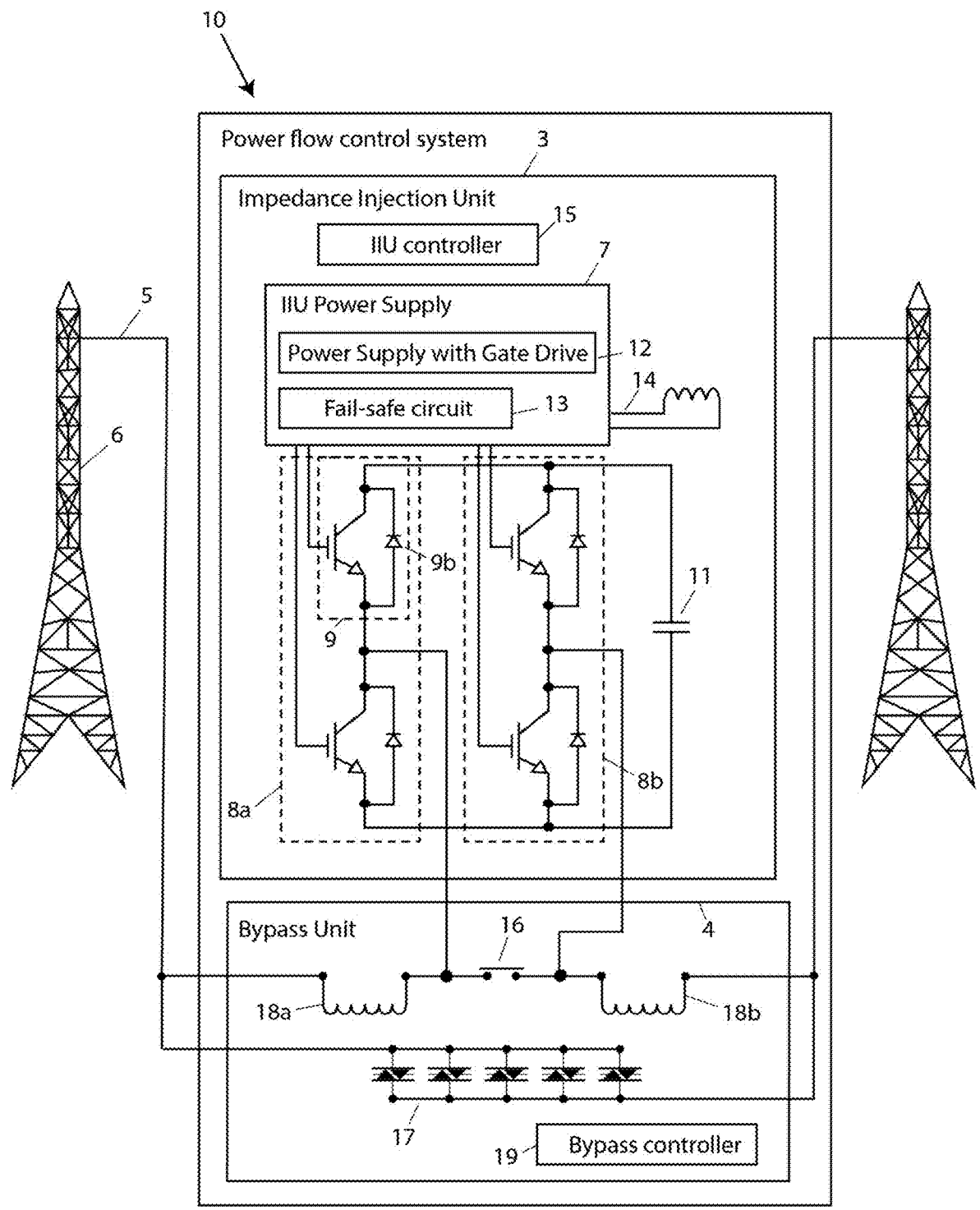
FIG. 1 illustrates a power flow control system connected into a power transmission line in an embodiment.

FIG. 1 illustrates a power flow control system according to an embodiment. As shown, power flow control system 10 includes an impedance injection unit (ITU) 3 and a bypass unit 4 connected to a power transmission line 5 carried by transmission towers 6. In FIG. 1, the connection of the bypass unit 4 to the power transmission line 5 is a series insertion of the bypass unit 4 into the power transmission line 5. The impedance injection unit 3 includes an ITU power supply 7, ITU controller 15, and power switching assemblies 8a and 8b having high power switching devices 9, such as IGBTs (insulated-gate bipolar transistors). Each of the switching devices 9 may include a transistor, for example a bipolar junction transistor (BJT), field-effect transistor (FET), etc., and an antiparallel diode 9b connected or coupled across the transistor. Power switching assemblies 8a and 8b together comprise a four-quadrant inverter that is used to charge and discharge a DC capacitor 11, which may also be called a link capacitor. IIU power supply 7 may include a base power supply with gate drive 12 and a fail-safe circuit 13 and is operable to harvest power from an internal current transformer 14. The impedance injection unit 3 is operated by the ITU controller 15, through the power supply with gate drive 12 and the fail-safe circuit 13, to compensate for the fault current on the power transmission line 5.

Continuing with FIG. 1, bypass unit 4 includes a vacuum switched link (VSL) 16 and a bank of silicon-controlled rectifiers (SCRs) 17 with the SCRs 17 in parallel with each other, where each SCR 17, the bank of SCRs 17 and/or the VSL 16 may be used to bypass a fault current to protect the impedance injection unit 3, and in particular the power switching assemblies 8a and 8b. Bypass unit 4 also includes differential chokes 18a and 18b. VSL 16 is arranged in parallel across the four-quadrant inverter formed by the power switching assemblies 8a and 8b, and in series with the differential chokes 18a and 18b. The combination series-parallel circuit, of the differential chokes 18a and 18b in series with the VSL 16, which is in parallel with the four-quadrant inverter, is in parallel with the bank of SCRs 17. A bypass controller 19 may be configured to control the operation of bypass unit 4, i.e., control the VSL 16 and each of one or more SCRs 17. Power flow control systems may comprise one of bypass unit 4 and several of IIU 3, creating an impedance injection module (IIM). In variations for further embodiments, the IIU controller 15 and the bypass controller 19 could be implemented as a single controller, or a distributed controller.

Figure 2:
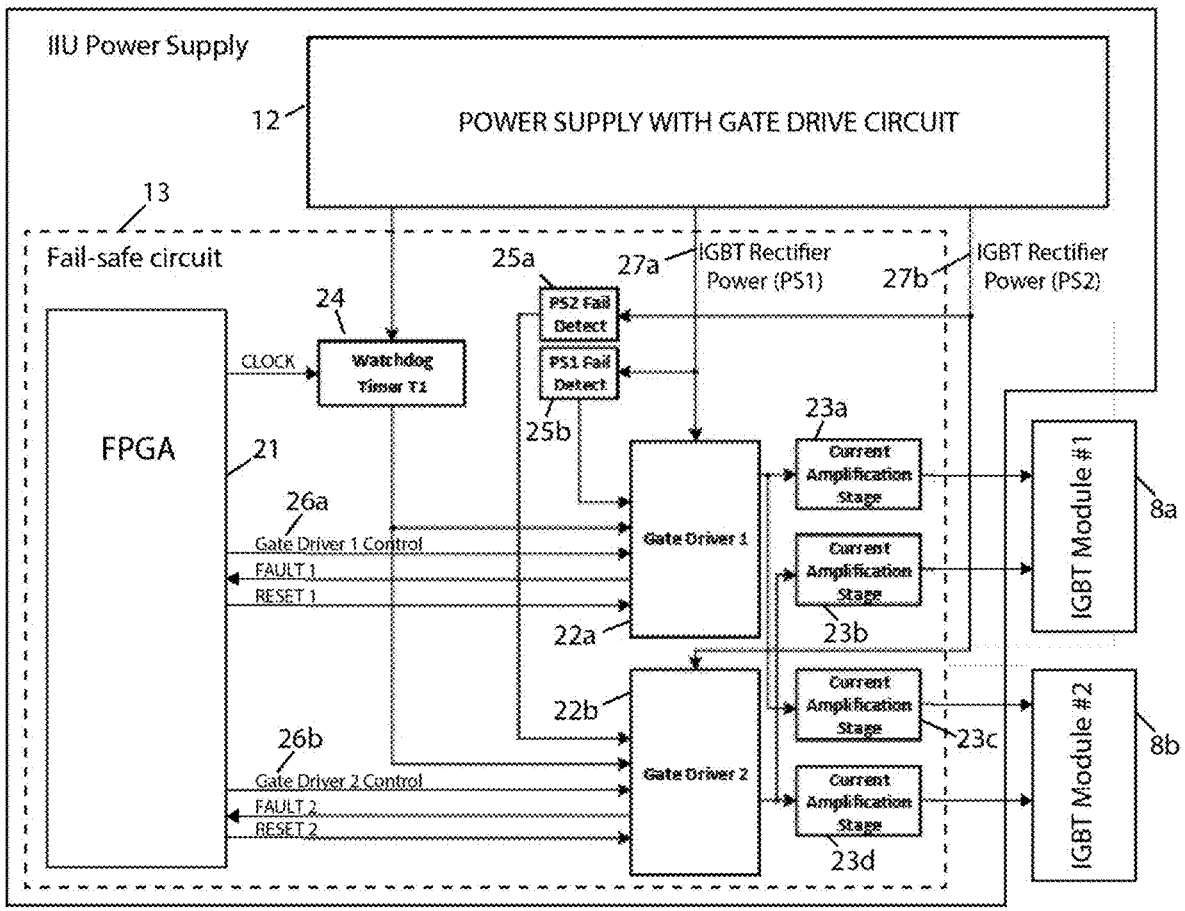
FIG. 2 illustrates a fail-safe circuit used to control the inputs to an inverter of the power flow control system during an initial fault current in an embodiment.

FIG. 2 illustrates an IIU power supply 7, for example IIU power supply 7 of FIG. 1, according to an embodiment. In FIG. 2, IIU power supply 7 includes a power supply with gate drive 12 and fail-safe circuit 13 with power-safe circuitry. Outputs of power supply with gate drive 12 include an IGBT rectifier power 27a (labeled PS1) together with a second IGBT rectifier power 27b (labeled PS2). Fail-safe circuit 13 with power-safe circuitry includes a field programmable gate array (FPGA) 21, gate driver circuits 22a and 22b, current amplifier stages 23a, 23b, 23c, and 23d, a watchdog timer 24, and PS1 and PS2 fail detect circuits 25a and 25b. IIU power supply 7 operates to control inputs to IGBT modules in power switching assemblies 8a and 8b, comprising the four-quadrant inverter, during both an initial fault current and a final fault current. During the initial fault current, before base power supply with gate drive 12 has stabilized, resistors in current amplifier stages 23a, 23b, 23c, and 23d are used to hold power switching devices such as the IGBT of power switching device 9 in a non-conducting state, to be further described in reference to FIG. 3. This protects the power switching devices from damage due to the high surge current. FPGA 21 takes time to boot up. When base power supply with gate drive 12 wakes up and the output voltage crosses a pre-defined threshold, as measured by the PS1 and PS2 fail detect circuits 25a and 25b, a different gate drive logic is enabled through gate driver circuits 22a and 22b. The circuits then take over control of the transistor power-safe circuitry, holding the power switching devices in their non-conducting state. Providing redundant control, when the outputs of FPGA 21 become stable, including gate driver control outputs 26a and 26b, this provides an alternative logic for enabling the transistor power-safe circuitry. For example, the redundant control with alternative logic could be implemented with logic gates and/or analog circuitry that receives input from the fail detect circuits 25a and 25b and the FPGA 21, e.g., gate driver control outputs 26a and 26b and combines such signaling to direct the current amplifier stages 23a, 23b, 23c and 23d. The redundant control helps to eliminate single-point failure modes. Meanwhile the initial fault current is bypassed using VSL 16, and the final fault current is bypassed by a parallel combination of VSL 16 and bank of SCRs 17, to be further described in reference to FIG. 4. In further embodiments, various further components and designs for inverters can be used, along with various appropriate circuits and components for driving and bypassing inverters, as readily devised in keeping with the teachings herein.

Figure 3:
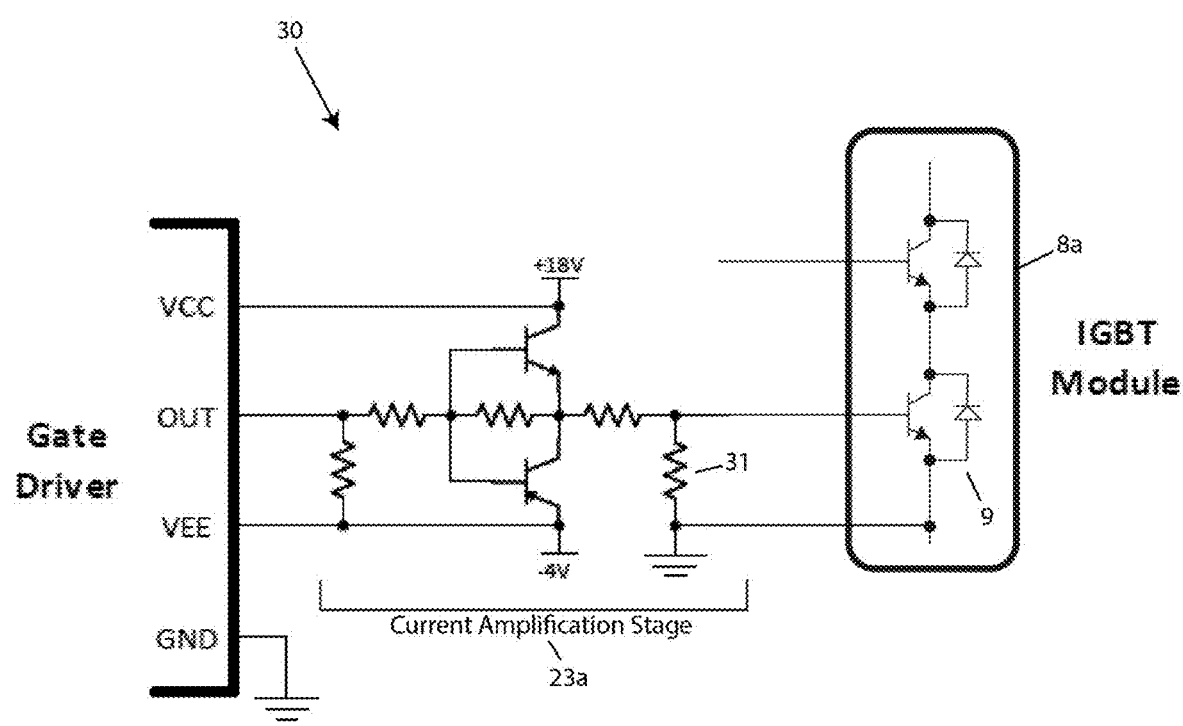
FIG. 3 is an expanded view of an amplification stage of the fail-safe circuit showing a gate-to-emitter connection using a resistor in an embodiment.

FIG. 3 is an expanded view of an amplification stage of the fail-safe circuit showing a gate-to-emitter connection using a resistor in an embodiment. In FIG. 3, circuitry 30 may include current amplification stages, for example current amplifier stage 23a of FIG. 2, connected using a protective interface to power switching device 9 (as previously described). Resistor 31 is a pull-down resistor connected to ground, and it connects between a gate and an emitter of a power switching device 9. The power switching device 9 (e.g., IGBT) is turned ON by applying a positive voltage at the gate with respect to the emitter. Typically, a voltage as low as 4-6 volts will turn the device ON, but 13-15 volts are required for a hard turn-on with low losses. A resistance connected between emitter and gate terminals can hold the gate voltage near zero, even in the presence of noise. Accordingly, during the initial fault current, resistor 31 holds power switching device 9 in its non-conducting state, thereby protecting it. Any other means may be used to hold power switching device 9 in its non-conducting state.

Figure 4:
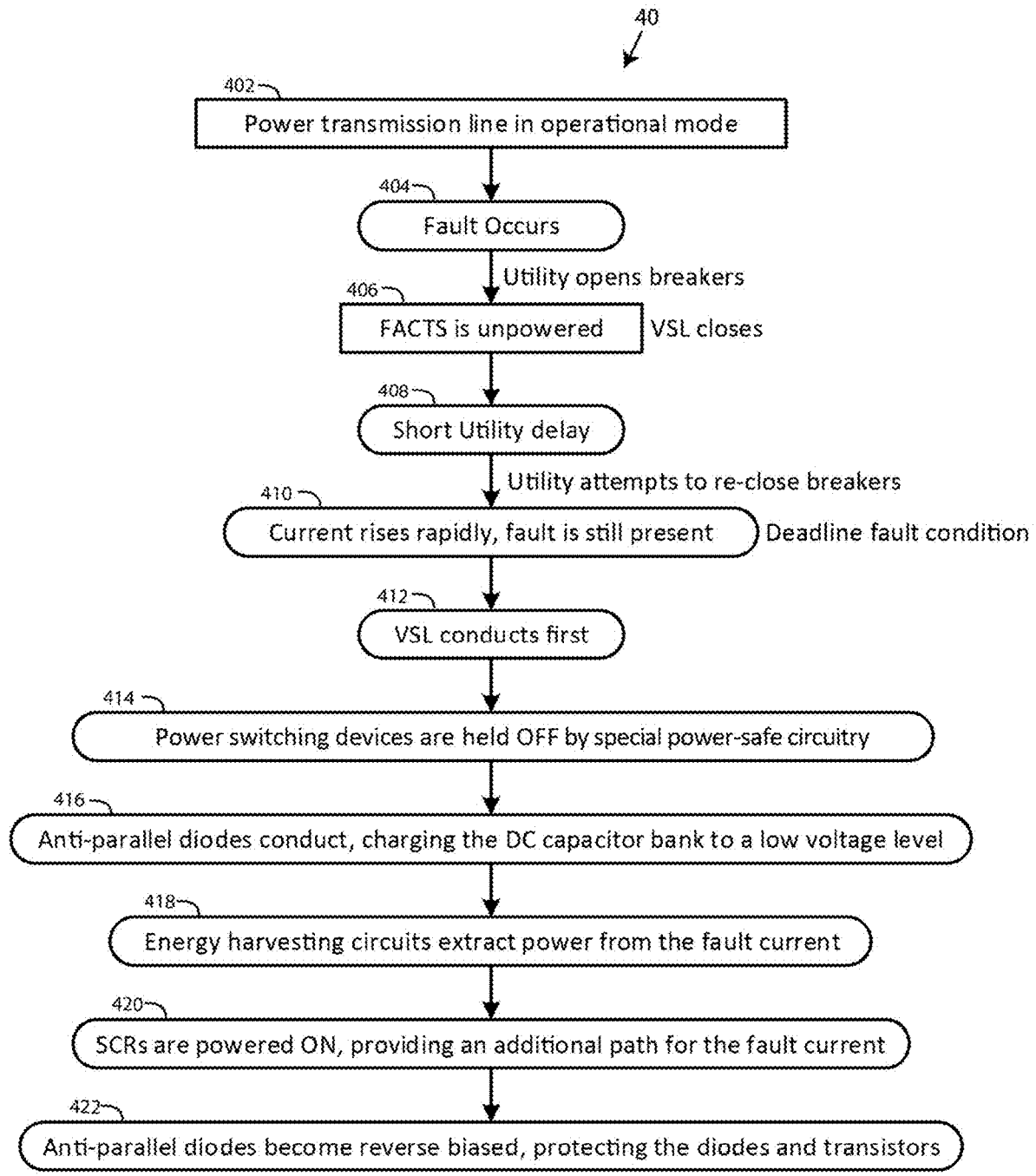
FIG. 4 is a flow chart of a sequence of events occurring during an initial fault current in an embodiment.

FIG. 4 is a flow chart depicting a sequence 40 of events or actions, herein called steps, that occur during a fault in a power transmission line, in one embodiment of a method of operation of the power flow control system 10 of FIG. 1. The descriptions of events are tailored for the case of a deadline fault, but the sequence or variation thereof may apply to many forms of transmission line fault(s). The sequence begins with the power transmission line in operational mode, step 402. In step 404 a fault occurs. This could be a phase-to-phase fault due to high winds, a ground fault due to a falling tree, or any other kind of fault that produces a fault current in the transmission line. Normally the utility will open breakers automatically to limit the fault to a geographic area, as described in the transition between step 404 and step 406. In step 406, a VSL 16 closes, and the FACTS (flexible alternating current transmission system, e.g., one or multiple IIUs 3, for example one or more four-quadrant inverters or switching assemblies) is unpowered. In step 408, there is a short utility delay, after which the utility attempts to re-close breakers. This causes an initial current rise, step 410. The current rises rapidly but the fault is still present in the case of a deadline fault. The VSL 16 can be held CLOSED by a strong spring that does not require power. The VSL 16 in the closed state conducts first, step 412, to bypass current around the inverter, e.g., a four-quadrant inverter. In step 414 the power switching devices 9 in power switching assemblies 8a and 8b are held OFF by special power-safe circuitry, described in reference to FIGS. 2 and 3. In step 416, antiparallel diodes (such as diodes 9b in IGBT modules of power switching assemblies 8a and/or 8b of FIG. 1) conduct, charging the DC capacitor 11 to a low voltage level. Energy harvesting circuits extract power from the fault current in step 418 and may use an internal current transformer 14 coupled to the power transmission line 5 for this purpose. When the energy harvested power reaches a threshold voltage level, the SCRs 17 are turned ON, step 420, providing an additional path for the fault current. When the voltage on the DC capacitor 11 equals the lesser of the VSL closed-state voltage (with any loop drop), or the ON-state voltage of the paralleled bank of SCRs, the anti-parallel diodes 9b would become reverse biased and do not conduct, thereby protecting them from damage.

Figure 5:
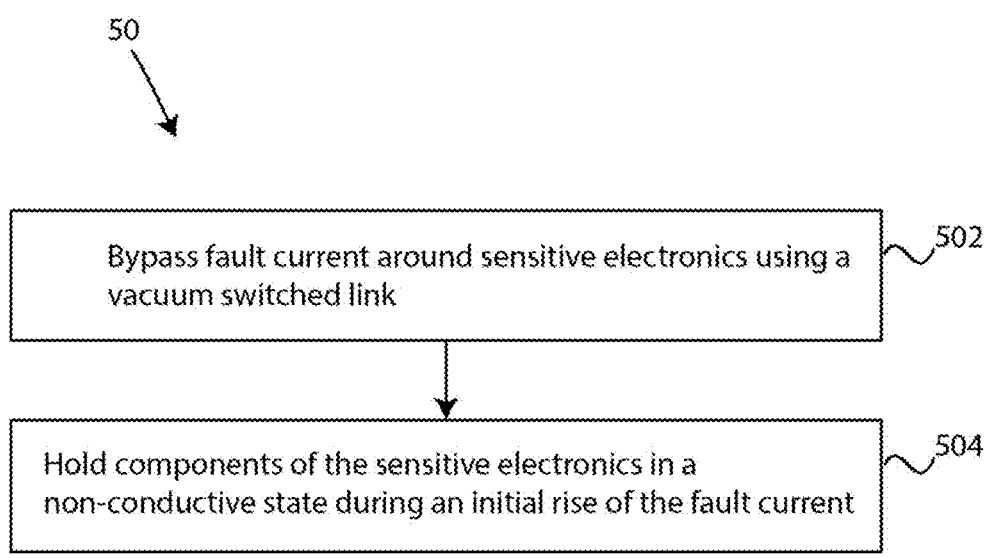
FIG. 5 is a flow chart of a method for protecting sensitive electronic circuits in a power flow control system in an embodiment.

FIG. 5 illustrates a method 50 for protecting sensitive circuits from a fault in a power transmission line. In step 502, current is bypassed around the sensitive electronics using a vacuum switched link. In step 504 the sensitive electronics are held in a non-conducting state by special fail-safe circuitry, during an initial rise of the fault current. The method may further include bypassing fault current using a bank of silicon-controlled rectifiers. The method may also further include harvesting of power from the fault current, in order to provide control signals at the earliest possible point in time. The method may further include activating a controller 19 when stable power is available, to safely manage the protecting of equipment attached to the power transmission line, e.g., by operating a bypass unit 4 to bypass the inverter, and activating a controller 15 operate the inverter to charge and discharge the DC capacitor 11 to compensate for the fault in the power transmission line with the inverter not bypassed.

The teachings contained in the embodiments described herein may be applied to protection of sensitive electronics contained in any equipment attached to a power transmission line.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A power flow control system, comprising:
   a four-quadrant inverter having power switching devices and a capacitor, arranged for connection into a power transmission line and charging and discharging the capacitor, wherein each of the power switching devices comprises an antiparallel diode; and
   a power-safe circuit connected to the four-quadrant inverter to hold inactive the power switching devices during an initial fault current of the power transmission line, until a power supply for operating the four-quadrant inverter reaches a threshold.

2. The power flow control system of claim 1, wherein:
   the power supply is connected to the power-safe circuit and arranged to couple to a transformer for harvesting electrical power from the power transmission line.

3. The power flow control system of claim 1, wherein the power-safe circuit comprises:
   fail detect circuitry, arranged to connect to the power supply to detect the power supply reaching the threshold.

4. The power flow control system of claim 1, further comprising a vacuum switched link in parallel with the four-quadrant inverter.

5. The power flow control system of claim 1, further comprising a bypass unit arranged to bypass the four-quadrant inverter, the bypass unit comprising:
   a vacuum switched link (VSL); and
   one or more silicon-controlled rectifiers (SCRs).

6. The power flow control system of claim 1, wherein the power-safe circuit comprises:
   driver circuitry connected to drive the four-quadrant inverter; and
   the driver circuitry comprising an amplification stage with circuitry to hold inactive each of the power switching devices during the initial fault current of the power transmission line.

7. The power flow control system of claim 1, further comprising:
   redundant control with alternative logic for enabling the power-safe circuit.

8. The power flow control system of claim 1, further comprising:
   a controller to operate the four-quadrant inverter, through the power-safe circuit, for the charging and the discharging of the capacitor.

9. The power flow control system of claim 1, further comprising:
   a bypass unit, connected to the four-quadrant inverter; and
   a controller to operate the bypass unit to bypass the four-quadrant inverter.

10. A power flow control system, comprising:
    a four-quadrant inverter having power switching devices and a capacitor, wherein each of the power switching devices comprises an antiparallel diode;
    a bypass unit connected and arranged to bypass the four-quadrant inverter and arranged for connection to a power transmission line;
    a power supply;
    a power-safe circuit coupled to the power supply and to the four-quadrant inverter to hold inactive the power switching devices during a fault on the power transmission line, until the power supply reaches a threshold; and
    a controller, coupled to the four-quadrant inverter through the power-safe circuit, to control the four-quadrant inverter to charge and discharge the capacitor to compensate for the fault on the power transmission line.

11. The power flow control system of claim 10, further comprising:
    a transformer, connected to the power supply and arranged to couple to the power transmission line, wherein the power supply and the transformer are to cooperate to harvest electrical power from the power transmission line.

12. The power flow control system of claim 10, wherein the power-safe circuit comprises:
    fail detect circuitry connected to the power supply to detect the power supply reaching the threshold.

13. The power flow control system of claim 10, wherein each of the power switching devices further comprises an insulated gate bipolar transistor (IGBT).

14. The power flow control system of claim 10, wherein the bypass unit comprises:
    a vacuum switched link (VSL); and
    a bank of silicon-controlled rectifiers (SCRs).

15. The power flow control system of claim 10, wherein the power-safe circuit comprises:

driver circuitry comprising an amplification stage connected to the four-quadrant inverter to drive the four-quadrant inverter and having a pull-down resistor to hold inactive each of the power switching devices during an initial fault current of the power transmission line.

16. The power flow control system of claim 10, wherein the power-safe circuit comprises:
   redundant control with alternative logic to direct current amplifier stages connected to the power switching devices of the four-quadrant inverter.

17. The power flow control system of claim 10, wherein the controller comprises one or more controllers or a distributed controller, to:
   operate the bypass unit to bypass the four-quadrant inverter and not bypass the four-quadrant inverter; and
   operate the four-quadrant inverter, through the power-safe circuit, for the charging and the discharging of the capacitor with the four-quadrant inverter coupled to the power transmission line through the bypass unit and not bypassed.

18. A method of operation of a power flow control system, comprising:
   holding inactive a plurality of power switching devices of a four-quadrant inverter that is coupled to a power transmission line through a bypass unit, during a fault on the power transmission line, until a power supply that is harvesting power from the power transmission line reaches a threshold, wherein each of the plurality of power switching devices comprises an antiparallel diode;
   bypassing, through the bypass unit, the four-quadrant inverter; and
   operating the four-quadrant inverter to charge and discharge a capacitor of the four-quadrant inverter to compensate for the fault on the power transmission line, with the four-quadrant inverter not bypassed.

19. The method of claim 18, wherein the bypassing through the bypass unit comprises:
   closing a vacuum switched link (VSL) during an initial current rise of the fault on the power transmission line; and
   turning on one or more silicon-controlled rectifiers (SCRs) when the power supply reaches the threshold.

20. The method of claim 18, further comprising:
   activating a controller when the power supply reaches the threshold;
   operating the bypass unit, by the activated controller; and
   operating the four-quadrant inverter, by the activated controller, with the four-quadrant inverter not bypassed by the bypass unit.

* * * * *